Figure 1:
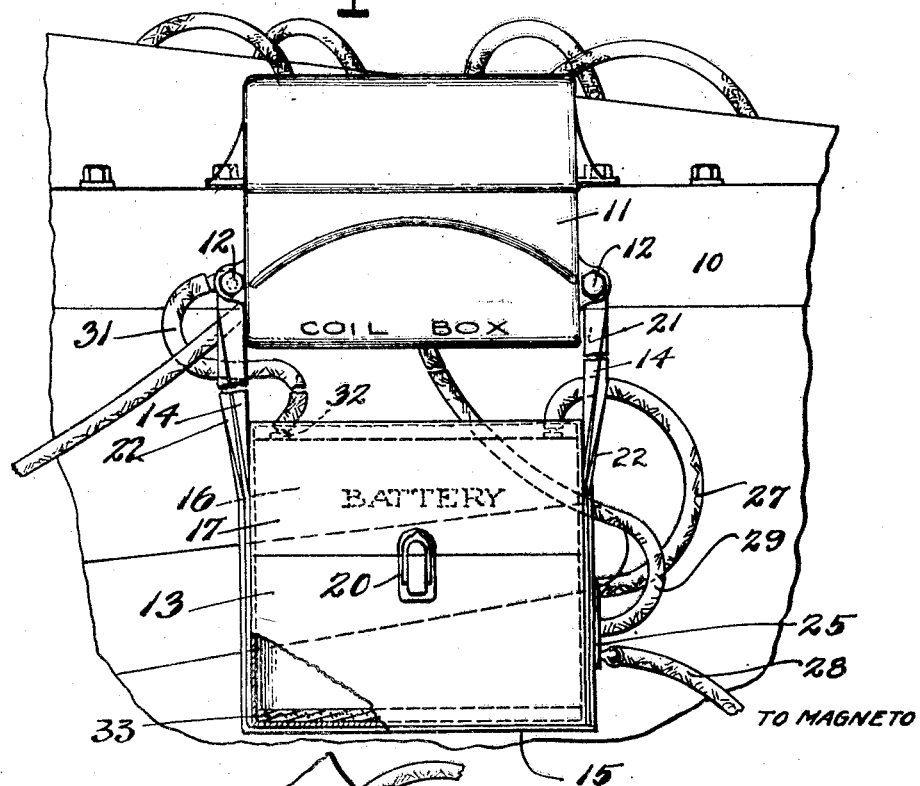

July 13, 1926.  1,592,664

R. HUNTER

BATTERY BOX SUPPORT

Filed Feb. 13, 1925

Witness: E. H. Wagner.

Inventor
Roy Hunter
By Robb, Robb & Hill
Attorneys

Patented July 13, 1926.

1,592,664

UNITED STATES PATENT OFFICE.

ROY HUNTER, OF ORCHARD, NEBRASKA.

BATTERY-BOX SUPPORT.

Application filed February 13, 1925. Serial No. 9,013.

This invention relates to a battery box, and particularly to a construction adapted for application in connection with the coil box of a tractor of the Fordson type, although capable of other applications. The starting of such a tractor by manual cranking of the engine has heretofore been quite difficult owing to the low grade of fuel used, the fact that the lubricant is of a heavy character, and the weight of the fly wheel. In order to secure sufficient current from the magneto for a proper spark it is practically necessary to spin the crank shaft of the engine which is a difficult proposition requiring considerable power.

The starting of such a tractor frequently requires considerable time resulting in a consequent loss to the user so that it becomes desirable to provide means for supporting a battery for cooperation with the coil box in order to afford a spark of proper intensity as soon as the engine is manually cranked, thus saving time and the expenditure of labor in the usual protracted cranking operation.

It is also important to provide a box for mounting this battery as a detachable unit in connection with the coil box so as to permit convenient access to the battery and to provide for the proper control of the electric current therefrom.

The invention has for an object to provide a novel and improved construction wherein the battery box is provided with a closure at its upper portion and an upwardly extending bracket therefrom for supporting said box in associated relation with a coil box.

A further object of the invention is to provide an improved construction of this supporting bracket adapted to embrace the sides and bottom of the box and having its upward extension disposed rearwardly for connection with fixed parts of the normal engine construction.

Another object of the invention is to provide an improved construction of battery box having a diagonally disposed cover pivoted at the rear thereof and a battery located therein and provided with circuit connections cooperating with a switch carried by the box to control such circuits.

Other and further objects and advantages of the invention will be hereinafter set forth and the novel features thereof defined by the appended claims.

Figure 2:
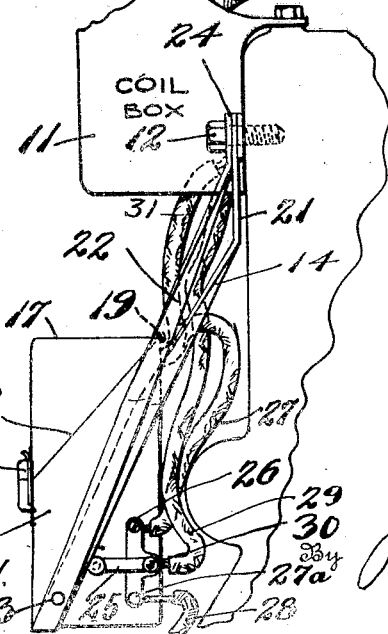

In the drawings:

Figure 1 is a side elevation showing the invention applied; and Figure 2 is an end view thereof.

Like numerals refer to like parts on the figures of the drawing.

The numeral 10 designates the engine frame of a tractor which may be of any desired type or construction and to which the usual coil box 11 is secured by means of the stud bolts 12 threaded into the engine frame.

The battery box 13 forming the subject of this invention is adapted to be suspended from the stud bolts by means of hangers 14 which extend down the opposite sides of the box to the bottom thereof. The box is adapted to contain any desired type of battery suitable for ignition purposes, for instance a hot shot battery 16 which substantially fills the boxing, and for the purpose of introducing and removing this battery when desired the box is provided with a cover member 17 having a diagonal line of closure 18 with the box body 13 and hinged thereto at its rear edge 19. This permits the cover to be opened into such position that the battery may be conveniently removed from the box and the cover is further provided with a suitable latch member 20 for retaining it in closed position.

In order to offset the box from the engine structure to permit convenient access thereto the hanger member 14 extends diagonally downward and is formed at its free end with a vertically disposed portion 21 which passes over the stud bolt 12. As the battery carried by the box is of considerable weight, it is desirable to reinforce this hanger by the substantially parallel strip 22 which is riveted to the hanger at 23 and provided at its upper end with a vertical portion 24 also retained by the stud bolt 12. This reinforcing strip is of substantially U-shape and extends beneath the bottom 15 of the box. The rivets 23 may also be used to connect the straps to the battery box.

It is further proposed to provide the box with a suitable switch 25 mounted thereon and having one terminal 26 connected by line 27 with the battery and an opposite terminal 27ª connected by line 28 to the usual magneto generator, while the movable member of the switch is in circuit with the coil box 11 by a line 29 extending from the terminal 30 to the coil box. The opposite terminal of the coil box is connected by a line 31 with the battery terminal 32, as shown in Figure 1.

This arrangement provides a simple construction by which the battery may be switched into circuit with the coil box and used for starting purposes, and the switch subsequently shifted to feed from the magneto to said coil box, thus reserving the battery power for subsequent starting use. The battery box may be formed of any desired material, preferably of sheet metal, and of a width substantially equal to that of the coil box, while a fibre padding 33 may be provided on the base of the battery box to prevent undue wear of the battery thereon.

The operation of the invention will be obvious from the foregoing description and it will be seen that a battery supporting receptacle is provided adapted for attachment as a unit to the normal construction on the market and the structure of this receptacle or box permits the convenient removal and replacement of the battery with circuit connections thereto established on the battery box. The construction presents a very efficient and economically manufactured attachment adapted to render relatively easy the starting of a tractor and embodies therein the advantages of an ignition battery present in the usual passenger vehicle construction.

While the specific construction of the parts has been shown and described, still the invention is not confined thereto as changes and alterations may be made without departing from the spirit of the invention as defined by the appended claim.

Having thus described my invention, what I claim as new and desire to secure by Letters Patent is:

A battery box hanger comprising a U-shaped bracket adapted to embrace the sides and bottom of a battery box and having rearwardly extending hanger arms terminating at their free end portions in vertically disposed attaching extensions, and a supporting strap extending from said arms at their lower portions and provided with a parallel attaching portion.

In testimony whereof I affix my signature.

ROY HUNTER.